United States Patent
Taherzadeh Boroujeni et al.

(10) Patent No.: US 12,232,178 B2
(45) Date of Patent: Feb. 18, 2025

(54) PHASE TRACKING REFERENCE SIGNAL (PTRS) FOR RANDOM ACCESS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 17/654,715

(22) Filed: Mar. 14, 2022

(65) Prior Publication Data

US 2022/0353918 A1 Nov. 3, 2022

Related U.S. Application Data

(60) Provisional application No. 63/201,443, filed on Apr. 29, 2021.

(51) Int. Cl.
*H04W 74/0833* (2024.01)
*H04L 5/00* (2006.01)

(52) U.S. Cl.
CPC ....... *H04W 74/0833* (2013.01); *H04L 5/0053* (2013.01)

(58) Field of Classification Search
CPC ............. H04W 74/0833; H04L 5/0053; H04L 5/0094; H04L 5/005; H04L 5/0051; H04L 5/0078
See application file for complete search history.

(56) References Cited

U.S. PATENT DOCUMENTS

| | | | |
|---|---|---|---|
| 2021/0100039 A1* | 4/2021 | Zhang | H04W 74/0833 |
| 2022/0070940 A1* | 3/2022 | Taherzadeh Boroujeni | H04B 7/0695 |
| 2022/0123819 A1* | 4/2022 | Taherzadeh Boroujeni | H04W 74/0833 |

FOREIGN PATENT DOCUMENTS

WO 2020237452 A1 12/2020

OTHER PUBLICATIONS

International Search Report and Written Opinion—PCT/US2022/071157—ISA/EPO—Jun. 15, 2022.

* cited by examiner

*Primary Examiner* — Charles C Jiang
*Assistant Examiner* — Rachel Elizabeth Marks
(74) *Attorney, Agent, or Firm* — Arun Swain

(57) ABSTRACT

This disclosure provides systems, methods, and apparatuses for a wireless node to receive a phase tracking reference signal (PTRS) transmitted inside a downlink random access channel (RACH) message. The wireless node may receive a downlink RACH message that includes a PTRS based on an indication received in a downlink RACH message or a physical downlink control channel (PDCCH) associated with a downlink RACH message. In some aspects, the wireless node may utilize the PTRS for phase error correction or frequency error correction (such as frequency error caused by Doppler effects). This disclosure also provides systems, methods, and apparatuses for a component of a base station to provide an indication that a PTRS is included in a downlink RACH message. The indication may be provided in a downlink RACH message or a PDCCH associated with a downlink RACH message.

30 Claims, 10 Drawing Sheets

PHASE TRACKING REFERENCE SIGNAL (PTRS) FOR RANDOM ACCESS

CROSS-REFERENCE TO RELATED APPLICATION

This Patent application claims priority to U.S. Provisional Patent Application No. 63/201,443, filed on Apr. 29, 2021, entitled "PHASE TRACKING REFERENCE SIGNAL (PTRS) FOR RANDOM ACCESS," and assigned to the assignee hereof. The disclosure of the prior Application is considered part of and is incorporated by reference into this Patent Application.

TECHNICAL FIELD

Aspects of the present disclosure relate generally to wireless communication and to techniques for a phase tracking reference signal (PTRS) for random access.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink (DL) and uplink (UL). "DL" (or "forward link") refers to the communication link from the base station to the UE, and the "UL" (or "reverse link") refers to the communication link from the UE to the base station. As will be described in more detail herein, a base station may be referred to as a NodeB, an LTE evolved nodeB (eNB), a gNB, an access point (AP), a radio head, a transmit receive point (TRP), a New Radio (NR) base station, or a 5G NodeB.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a wireless node. The method may include receiving a downlink random access channel (RACH) message including a phase tracking reference signal (PTRS); and performing a communication associated with the downlink RACH message.

In some aspects, the method can include receiving an indication that the downlink RACH message includes the PTRS.

In some aspects, the indication can be implicit in an indication of repetition or a parameter of repetition.

In some aspects, the downlink RACH message can include at least one of a second RACH message of a four-step RACH procedure, a fourth RACH message of the four-step RACH procedure, or a second RACH message of a two-step RACH procedure.

Another innovative aspect of the subject matter described in this disclosure can be implemented in an apparatus of a UE for wireless communication. The apparatus may include a first interface configured to obtain a downlink RACH message including a PTRS. The apparatus may include the first interface or a second interface configured to output a communication associated with the downlink RACH message.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to obtain a downlink RACH message including a PTRS; and output a communication associated with the downlink RACH message.

Another innovative aspect of the subject matter described in this disclosure can be implemented in an apparatus for wireless communication. The apparatus may include means for obtaining a downlink RACH message including a PTRS; and means for outputting a communication associated with the downlink RACH message.

Another innovative aspect of the subject matter described in this disclosure can be implemented in a method of wireless communication performed by an apparatus of a network entity, such as a base station (BS). The method may include transmitting a downlink RACH message including a PTRS; and performing a communication associated with the downlink RACH message.

Another innovative aspect of the subject matter described in this disclosure can be implemented in an apparatus of a network entity, such as a base station, for wireless communication. The apparatus may include an interface configured to output a downlink RACH message including a PTRS; and to output a communication associated with the downlink RACH message.

In some aspects, the method can include transmitting an indication that the downlink RACH message includes the PTRS.

In some aspects, the indication can be implicit in an indication of repetition or a parameter of repetition.

In some aspects, the downlink RACH message can include the PTRS if a condition is satisfied, and the condition can be associated with at least one of a frequency band of the downlink RACH message, a frequency range of the downlink RACH message, or a subcarrier spacing associated with the downlink RACH message.

In some aspects, the downlink RACH message can include at least one of a second RACH message of a four-step RACH procedure, a fourth RACH message of the four-step RACH procedure, or a second RACH message of a two-step RACH procedure.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a network entity, such as a base station, may cause the one or more processors to output a downlink RACH message including a PTRS; and to output a communication associated with the downlink RACH message.

Another innovative aspect of the subject matter described in this disclosure can be implemented in an apparatus for wireless communication. The apparatus may include means for outputting a downlink RACH message including a PTRS; and means for outputting a communication associated with the downlink RACH message.

Aspects generally include a method, apparatus, system, computer program product, non-transitory computer-readable medium, user equipment, base station, wireless communication device, or processing system as substantially described herein with reference to and as illustrated by the accompanying drawings and appendix.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
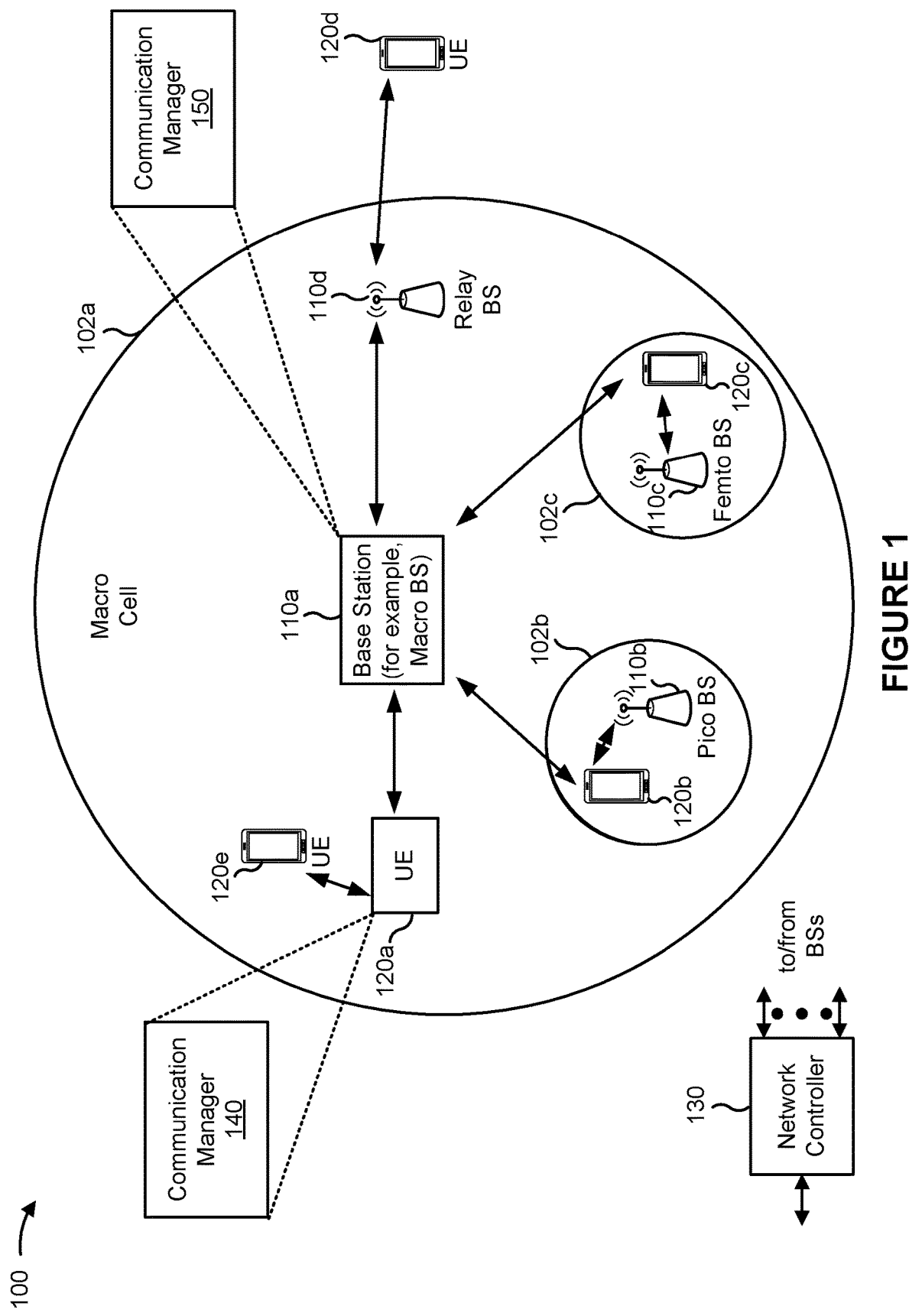
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Phase drift (sometimes referred to as phase jumps) refers to discontinuity or change in a signal's phase over time. Phase drift may introduce noise in some forms of wireless communication. For example, phase drift may lead to degraded performance for repetitious communications (in which phase drift may occur between repetitions of a communication) and in situations where a transmitter is unable to accurately maintain phase continuity. A phase tracking reference signal (PTRS) may be used in a communication system to identify phase drift and correct phase noise (such as oscillator phase noise). For example, a PTRS may be used to correct phase noise for millimeter wave (mmWave) communications, to provide phase continuity across repetitions for joint channel estimation (for example, by assisting a receiver to estimate or cancel phase jumps), or to reduce or correct frequency error (such as frequency error caused by Doppler effects), among other examples.

A PTRS may be configured by radio resource control (RRC) signaling, which may not be available during initial access for random access channel (RACH) communications. Because configuration of the PTRS may not be available during initial access, joint channel estimation may not be enabled for downlink RACH communications. Furthermore, certain operations, such as phase error correction and frequency error correction, may not be enabled for downlink RACH communications since the configuration of the PTRS may not be available during initial access. Single-shot downlink RACH communications (which may be required if phase drift cannot be controlled) may lead to low-capability UEs and UEs in poor coverage being unable to successfully receive a downlink RACH message.

Techniques described herein enable PTRS usage for initial access, such as in downlink RACH messages. For example, the PTRS can be transmitted within a downlink RACH message, such as RACH Message B (msgB) of a two-step RACH procedure, or RACH Message 2 or RACH Message 4 of a four-step RACH procedure. Some techniques described herein provide an indication of the presence of a PTRS, such as an indication received via a downlink RACH message or a physical downlink control channel (PDCCH) associated with a downlink RACH message, an implicit indication (such as based on an indication of repetition or a configuration of repetition), or preconfiguration via system information (SI). In some aspects, a wireless node (such as a UE, a sidelink node, a relay node, a BS, a transmit-receive point (TRP), a distributed unit, or a radio unit) may utilize the PTRS for phase error correction (such as between multiple repetitions of a downlink RACH message), frequency error correction (such as frequency error caused by Doppler effects), or similar operations.

Particular implementations of the subject matter described in this disclosure can be implemented to realize one or more of the following potential advantages. Joint channel estimation (sometimes referred to as demodulation reference signal (DMRS) bundling) may be enabled for downlink RACH messages since phase drift can be accurately estimated using the techniques described herein. Furthermore, frequency error may be detected and corrected, which may be beneficial for situations involving Doppler shift. By enabling joint channel estimation, reliability of downlink RACH messaging may be improved and coverage of low-capability UEs may be improved. By enabling the detection of frequency error in downlink RACH messages, reliability of downlink RACH messaging in mobility scenarios may be improved.

FIG. 1 is a diagram illustrating an example of a wireless network 100. The wireless network 100 may be or may include elements of a 5G New Radio (NR) network, an LTE network, or another type of network. The wireless network 100 may include one or more base stations 110 (shown as BS 110a, BS 110b, BS 110c, and BS 110d) and other network entities. A base station (BS) is an entity that communicates with user equipment (UEs) and also may be referred to as an NR base station, a Node B, a gNB, a 5G node B (NB), an access point, or a transmit receive point (TRP). Each base station may provide communication coverage for a particular geographic area. In 3GPP, the term "cell" can refer to a coverage area of a base station, a base station subsystem serving this coverage area, or a combination thereof, depending on the context in which the term is used.

A base station may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110a may be a macro base station for a macro cell 102a, a base station 110b may be a pico base station for a pico cell 102b, and a base station 110c may be a femto base station for a femto cell 102c. A base station may support one or multiple (for example, three) cells. The terms "eNB", "base station", "NR base station", "gNB", "TRP", "AP", "node B", "5G NB", and "cell" may be used interchangeably herein.

In some examples, a cell may not necessarily be stationary, and the geographic area of the cell may move according to the location of a mobile base station. In some examples, the base stations may be interconnected to one another as well as to one or more other base stations or network nodes (not shown) in the wireless network 100 through various types of backhaul interfaces, such as a direct physical connection, a virtual network, or a combination thereof, using any suitable transport network.

The wireless network 100 may include relay stations. A relay station is an entity that can receive a transmission of data from an upstream station (for example, a base station or a UE) and send a transmission of the data to a downstream station (for example, a UE or a base station). A relay station also may be a UE that can relay transmissions for other UEs. In the example shown in FIG. 1, a relay base station 110d may communicate with a macro base station 110a and a UE 120d in order to facilitate communication between the macro base station 110a and the UE 120d. A relay base station also may be referred to as a relay station, a relay base station, a relay, etc.

The wireless network 100 may be a heterogeneous network that includes base stations of different types, such as macro base stations, pico base stations, femto base stations, or relay base stations, among other examples. These different types of base stations may have different transmit power levels, different coverage areas, and different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

Multiple UEs 120 (for example, a UE 120a, a UE 120b, a UE 120c, etc.) may be dispersed throughout the wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, or location tags, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). A UE 120 may be included inside a housing that houses components of the UE 120, such as processor components, memory components, or other components. In some examples, the processor components and the memory components may be coupled together. For example, the processor components (for example, one or more processors) and the memory components (for example, a memory) may be operatively coupled, communicatively coupled, electronically coupled, or electrically coupled, among other examples.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some aspects, two or more UEs 120 (for example, shown as a UE 120a and a UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or a similar protocol), or a mesh network. In such examples, the UE 120 may perform scheduling operations, resource selection operations, as well as other operations described elsewhere herein as being performed by the base station 110.

Devices of the wireless network 100 may communicate using the electromagnetic spectrum, which may be subdivided based on frequency or wavelength into various classes, bands, or channels. For example, devices of the wireless network 100 may communicate using an operating band having a first frequency range (FR1), which may span from 410 MHz to 7.125 GHz. As another example, devices of the wireless network 100 may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may determine that a downlink random access channel (RACH) message includes a phase tracking reference signal (PTRS) and may perform a communication associated with the downlink RACH message. Additionally, or alternatively, the communication manager 140 may perform one or more other operations described herein.

In some aspects, the base station 110 may include a communication manager 150. As described in more detail elsewhere herein, the communication manager 150 may transmit a PTRS in a downlink RACH message and may perform a communication associated with the downlink RACH message. Additionally, or alternatively, the communication manager 150 may perform one or more other operations described herein. In some aspects, the communication manager 150 may be implemented at a network entity, such as a central unit, a distributed unit, a radio unit, or a combination thereof.

Deployment of communication systems, such as 5G NR systems, may be arranged in multiple manners with various components or constituent parts. In a 5G NR system, or network, a network node, a network entity, a wireless node, a mobility element of a network, a radio access network (RAN) node, a core network node, a network element, a base station (BS), a network equipment, or one or more units (or one or more components) performing base station functionality, may be implemented in an aggregated or disaggregated architecture. For example, a BS (such as a Node B (NB), evolved NB (eNB), NR BS, 5G NB, gNodeB (gNB), access point (AP), a transmit receive point (TRP), or a cell, etc.) may be implemented as an aggregated base station (also known as a standalone BS or a monolithic BS) or a disaggregated base station. As used herein, "wireless node" can refer to an aggregated base station, a disaggregated base station, or one or more units or components of an aggregated base station or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit. "Base station" and "wireless node", as used herein, can refer to an aggregated base station, or to a disaggregated base station, or to one or more components or units thereof.

Figure 2:
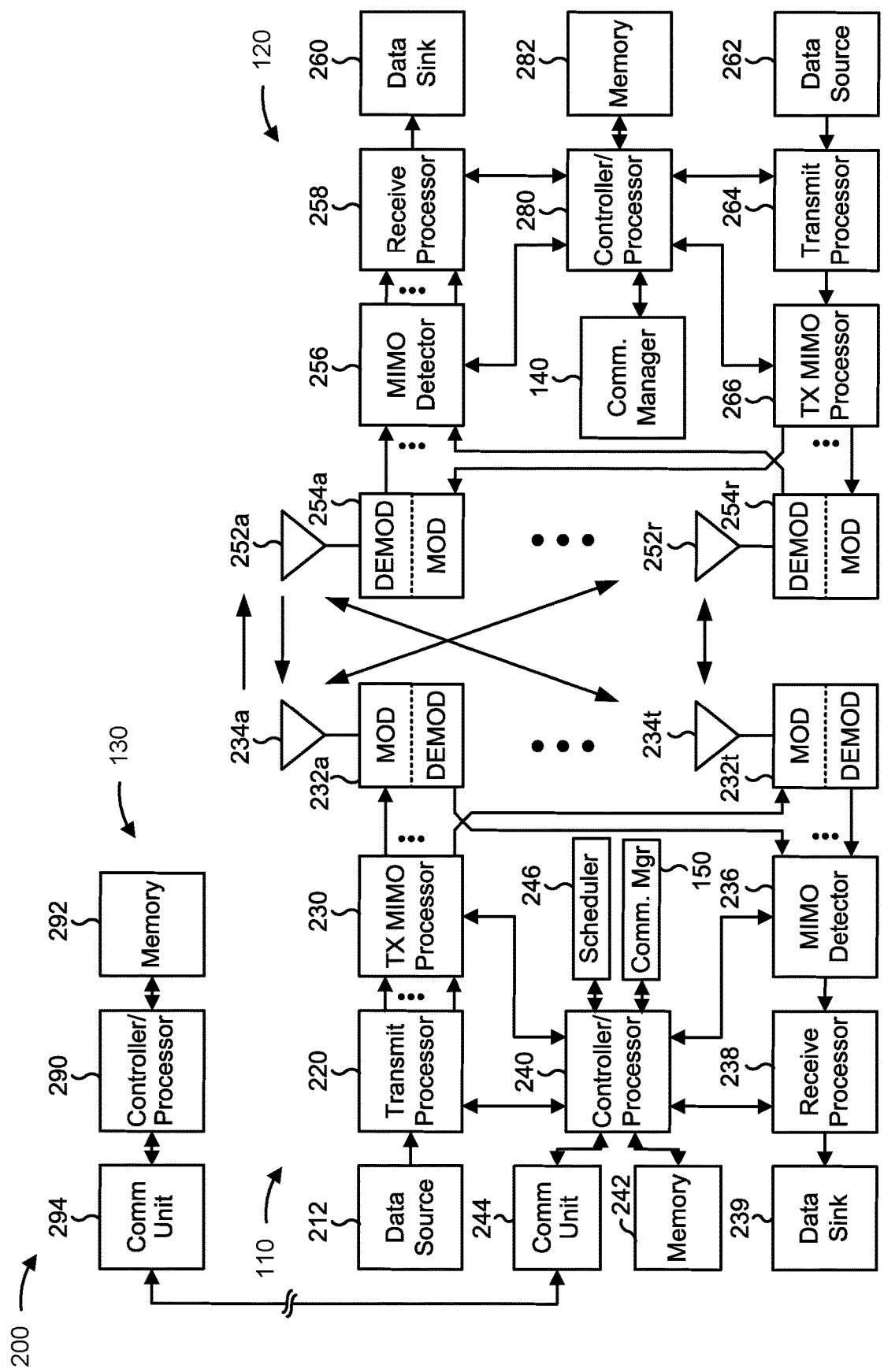
FIG. 2 is a diagram illustrating an example of a base station (BS) in communication with a user equipment (UE) in a wireless network.

FIG. 2 is a diagram illustrating an example 200 of a base station 110 in communication with a UE 120 in a wireless network 100. The base station 110 may be equipped with T antennas 234a through 234t, and the UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information) and control information (for example, CQI requests, grants, or upper layer signaling) and provide overhead symbols and control symbols. The transmit processor 220 also may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM) to obtain an output sample stream. Each modulator 232 may further process (for example, convert to analog, amplify, filter, and upconvert) the output sample stream to obtain a downlink signal. T downlink signals from the modulators 232a through 232t may be transmitted via T antennas 234a through 234t, respectively.

At the UE 120, the antennas 252a through 252r may receive the downlink signals from the base station 110 or other base stations and may provide received signals to the demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some aspects, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

Antennas (such as antennas 234a through 234t or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at the UE 120, a transmit processor 264 may receive and process data from a data source 262 and control information (for example, for reports including RSRP, RSSI, RSRQ, or CQI) from a controller/processor 280. The transmit processor 264 also may generate reference symbols for one or more reference signals. The symbols from the transmit processor 264 may be precoded by a TX MIMO processor 266 if applicable, further processed by the modulators 254a through 254r (for example, for DFT-s-OFDM or CP-OFDM) and transmitted to the base station 110. In some aspects, a modulator and a demodulator (for example, MOD/DEMOD 254) of the UE 120 may be included in a modem of the UE 120. In some aspects, the UE 120 includes a transceiver. The transceiver may include any combination of the antenna(s) 252, the modulators 254, the demodulators 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the base station 110, the uplink signals from the UE 120 and other UEs may be received by the antennas 234, processed by the demodulators 232, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include a communication unit 244 and may communicate with the network controller 130 via the communication unit 244. The base station 110 may include a scheduler 246 to schedule one or more UEs 120 for downlink communications, uplink communications, or a combination thereof. In some aspects, a modulator and a demodulator (for example, MOD/DEMOD 232) of the base station 110 may be included in a modem of the base station 110. In some aspects, the base station 110 includes a transceiver. The transceiver may include any combination of the antenna (s) 234, the modulators 232, the demodulators 232, the MIMO detector 236, the receive processor 238, the transmit processor 220, or the TX MIMO processor 230. The transceiver may be used by a processor (for example, the controller/processor 240) and a memory 242 to perform aspects of any of the processes described herein.

In some implementations, the controller/processor 280 may be a component of a processing system. A processing system may generally refer to a system or series of machines or components that receives inputs and processes the inputs to produce a set of outputs (which may be passed to other systems or components of, for example, the UE 120). For example, "processing system of the UE 120" may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface to receive or obtain information, and a second interface to output, transmit or provide information. In some cases, "first interface" may refer to an interface between the processing system of the chip or modem and a receiver, such that the UE 120 may receive information or signal inputs, and the information may be passed to the processing system. In some cases, "second interface" may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the controller/processor 240 may be a component of a processing system. A processing system may generally refer to a system or series of machines or components that receives inputs and processes the inputs to produce a set of outputs (which may be passed to other systems or components of, for example, the base station 110). For example, "processing system of the base station 110" may refer to a system including the various other components or subcomponents of the base station 110.

The processing system of the base station 110 may interface with other components of the base station 110, and may process information received from other components (such as inputs or signals), output information to other components, etc. For example, a chip or modem of the base station 110 may include a processing system, a first interface to receive or obtain information, and a second interface to output, transmit or provide information. In some cases, "first interface" may refer to an interface between the processing system of the chip or modem and a receiver, such that the base station 110 may receive information or signal inputs, and the information may be passed to the processing system. In some cases, "second interface" may refer to an interface between the processing system of the chip or modem and a transmitter, such that the base station 110 may transmit information output from the chip or modem. A person having ordinary skill in the art will readily recognize that the second interface also may obtain or receive information or signal inputs, and the first interface also may output, transmit or provide information.

In some aspects, the controller/processor 240 of the base station 110, the controller/processor 280 of the UE 120, or any other component(s) of FIG. 2 may perform one or more techniques associated with a phase tracking reference signal (PTRS) for random access, as described in more detail elsewhere herein. For example, the controller/processor 240 of the base station 110, the controller/processor 280 of the UE 120, or any other component(s) (or combinations of components) of FIG. 2 may perform or direct operations of, for example, process 700 of FIG. 7, process 800 of FIG. 8, or other processes as described herein. The memory 242 and the memory 282 may store data and program codes for the base station 110 and the UE 120, respectively. In some aspects, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 700 of FIG. 7, process 800 of FIG. 8, or other processes as described herein.

In some aspects, UE 120 may include means for receiving a downlink random access channel (RACH) message including a PTRS, means for performing a communication associated with the downlink RACH message, or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, or the like.

In some aspects, base station 110 may include means for transmitting a downlink RACH message including a PTRS, means for performing a communication associated with the downlink RACH message or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
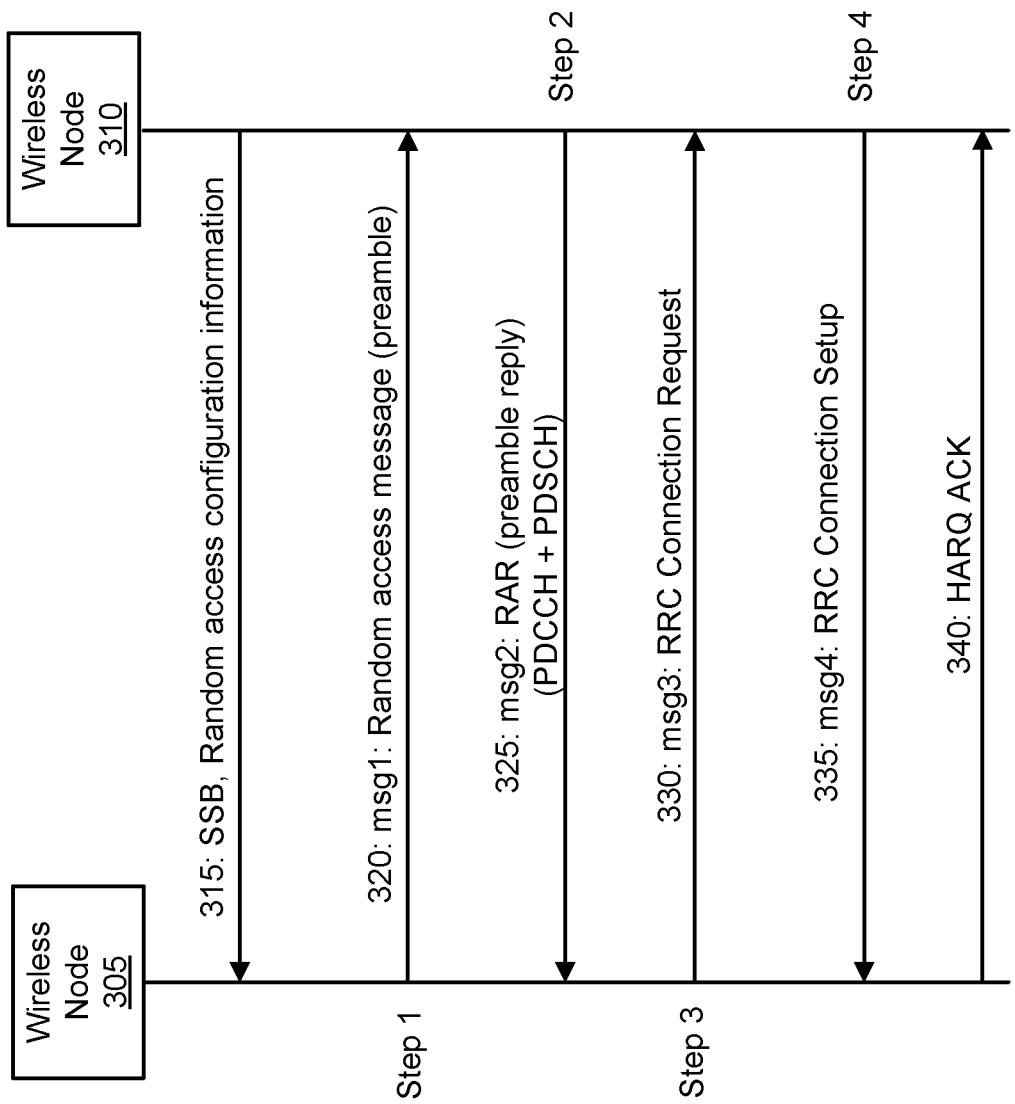
FIG. 3 is a diagram illustrating an example of a four-step random access procedure.

FIG. 3 is a diagram illustrating an example of a four-step random access procedure. As shown in FIG. 3, a wireless node 305 (which may include UE 120, BS 110, a relay node, a TRP, a sidelink device, a radio unit, a distributed unit, or another device) and a wireless node 310 (which may include UE 120, BS 110, a relay node, a TRP, a sidelink device, a radio unit, a distributed unit, a central unit, or another device) may communicate with one another to perform the four-step random access procedure. In some examples, the wireless node 305 may be a UE such as the UE 120 and the wireless node 310 may be a base station such as the BS 110.

As shown by reference number 315, the wireless node 310 may transmit, and the wireless node 305 may receive, one or more one or more synchronization signal blocks (SSBs) and random access configuration information. In some aspects, the random access configuration information may be transmitted in or indicated by system information (such as in one or more system information blocks (SIBs)) or an SSB, such as for contention-based random access. A SIB is a broadcast transmission of system information used to connect to or communicate with a cell, such as to perform cell selection or reselection, access a network via the cell, or detect paging messages. Additionally, or alternatively, the random access configuration information may be transmitted in a radio resource control (RRC) message or a physical downlink control channel (PDCCH) order message that triggers a random access procedure, such as for contention-free random access. The random access configuration information may include one or more parameters to be used in the random access procedure, such as one or more parameters for transmitting a random access message (RAM) or one or more parameters for receiving a random access reply (RAR).

As shown by reference number 320, the wireless node 305 may transmit a RAM, which may include a preamble (sometimes referred to as a random access preamble, a PRACH preamble, or a RAM preamble). The message that includes the preamble may be referred to as a RACH message 1, msg1, MSG1, a first message, or an initial message in a four-step random access procedure. The random access message may include a random access preamble identifier.

As shown by reference number 325, the wireless node 310 may transmit an RAR as a reply to the preamble. The message that includes the RAR may be referred to as RACH message 2, msg2, MSG2, a downlink RACH message, or a second message in a four-step random access procedure. In some aspects, the RAR may indicate the detected random access preamble identifier (such as received from the wireless node 305 in msg1). Additionally, or alternatively, the RAR may indicate a resource allocation to be used by the wireless node 305 to transmit message 3 (msg3). In some aspects, the RAR may include a PTRS, as described herein.

In some aspects, as part of the second step of the four-step random access procedure, the wireless node 310 may transmit a PDCCH communication for the RAR. The PDCCH communication may schedule a PDSCH communication that includes the RAR. For example, the PDCCH communication may indicate a resource allocation for the PDSCH communication. Also, as part of the second step of the four-step random access procedure, the wireless node 310 may transmit the PDSCH communication for the RAR, as scheduled by the PDCCH communication. The RAR may be included in a MAC PDU of the PDSCH communication.

As shown by reference number 330, the wireless node 305 may transmit an RRC connection request message. The RRC connection request message may be referred to as RACH message 3, msg3, MSG3, or a third message of a four-step random access procedure. In some aspects, the RRC connection request may include a UE identifier, UCI, or a PUSCH communication (such as an RRC connection request).

As shown by reference number 335, the wireless node 310 may transmit an RRC connection setup message. The RRC connection setup message may be referred to as RACH message 4, msg4, MSG4, a downlink RACH message, or a fourth message of a four-step random access procedure. In some aspects, the RRC connection setup message may include the detected UE identifier, a timing advance value, or contention resolution information. As shown by reference number 330, if the wireless node 305 successfully receives the RRC connection setup message, the wireless node 305 may transmit a HARQ ACK. In some aspects, the RRC connection setup message may include a PTRS, as described herein.

Figure 4:
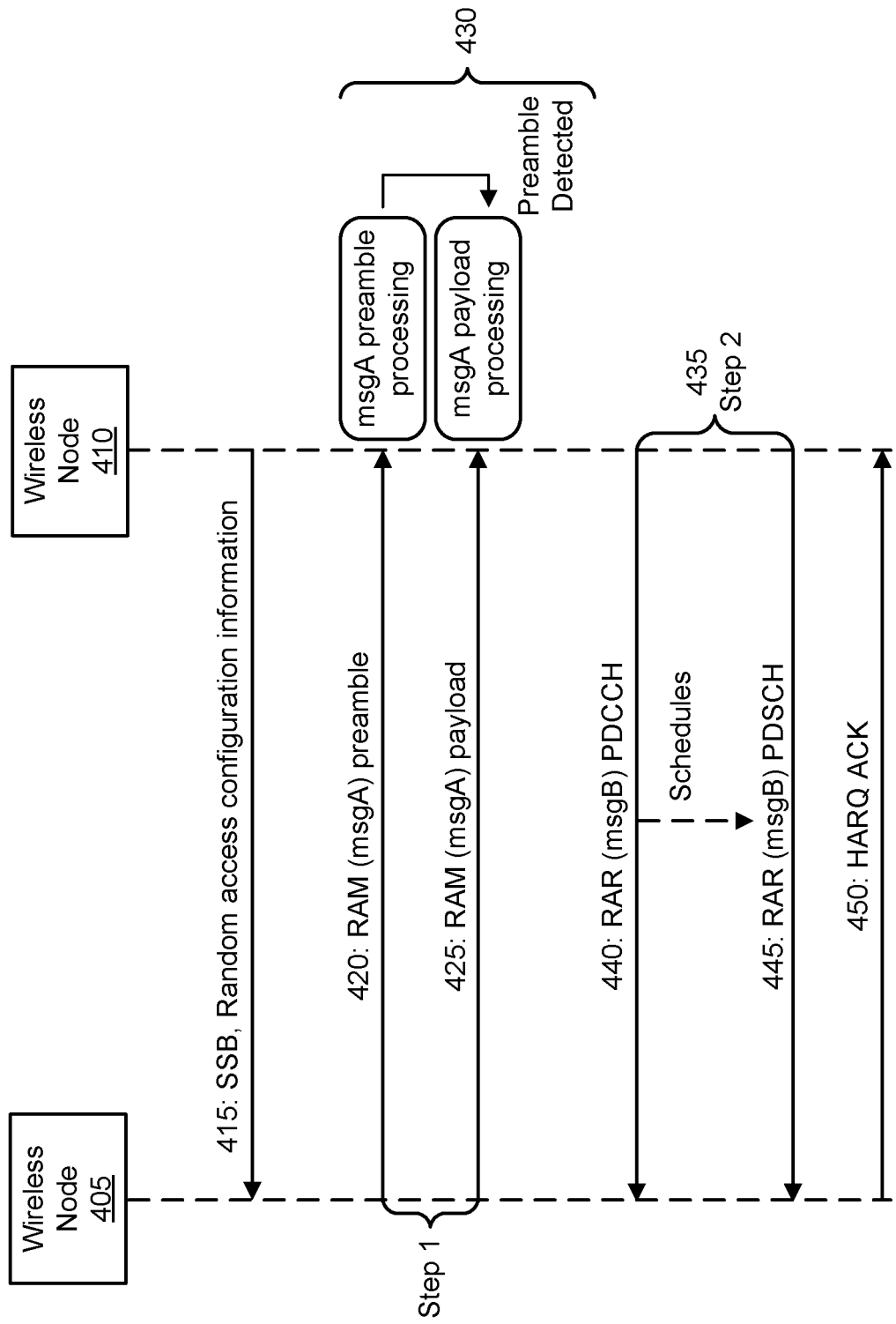
FIG. 4 is a diagram illustrating an example of a two-step random access procedure.

FIG. 4 is a diagram illustrating an example of a two-step random access procedure. As shown in FIG. 4, a wireless node 405 (which may include UE 120, BS 110, a relay node, a TRP, a sidelink device, a radio unit, a distributed unit, or another device) and a wireless node 410 (which may include UE 120, BS 110, a relay node, a TRP, a sidelink device, a radio unit, a distributed unit, or another device) may communicate with one another to perform the two-step random access procedure. In some examples, the wireless node 405 may be a UE such as the UE 120 and the wireless node 410 may be a base station such as the BS 110.

As shown by reference number 415, the wireless node 410 may transmit, and the wireless node 405 may receive, one or more SSBs and random access configuration information. In some aspects, the random access configuration information may be transmitted in or indicated by system information (such as in one or more system information blocks (SIBs)) or an SSB, such as for contention-based random access. Additionally, or alternatively, the random access configuration information may be transmitted in an RRC message or a PDCCH order message that triggers a RACH procedure, such as for contention-free random access. The random access configuration information may include one or more parameters to be used in the two-step random access procedure, such as one or more parameters for transmitting a RAM or receiving a RAR to the RAM.

As shown by reference number 420, the wireless node 405 may transmit, and the wireless node 410 may receive, a RAM preamble. As shown by reference number 425, the wireless node 405 may transmit, and the wireless node 410 may receive, a RAM payload. As shown, the wireless node 405 may transmit the RAM preamble and the RAM payload to the wireless node 410 as part of an initial (or first) step of the two-step random access procedure. In some aspects, the RAM may be referred to as RACH message A, msgA, a first message, or an initial message in a two-step random access procedure. Furthermore, in some aspects, the RAM preamble may be referred to as a RACH message A preamble, a msgA preamble, a preamble, or a PRACH preamble, and the RAM payload may be referred to as a RACH message A payload, a msgA payload, or a payload. In some aspects, the RAM may include some or all of the contents of message 1 (msg1) and message 3 (msg3) of a four-step random access procedure. For example, the RAM preamble may include some or all contents of message 1 (such as a PRACH preamble), and the RAM payload may include some or all contents of message 3 (such as a UE identifier, uplink control information (UCI), or a physical uplink shared channel (PUSCH) transmission).

As shown by reference number 430, the wireless node 410 may receive the RAM preamble transmitted by the wireless node 405. If the wireless node 410 successfully receives and decodes the RAM preamble, the wireless node 410 may then receive and decode the RAM payload.

As shown by reference number 435, the wireless node 410 may transmit an RAR (sometimes referred to as an RAR message). In some aspects, the RAR may be referred to as a downlink RACH message. As shown, the wireless node 410 may transmit the RAR message as part of a second step of the two-step random access procedure. In some aspects, the RAR message may be referred to as RACH message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, or contention resolution information. In some aspects, the RAR message may include a PTRS, as described herein.

As shown by reference number 440, as part of the second step of the two-step random access procedure, the wireless node 410 may transmit a physical downlink control channel (PDCCH) communication for the RAR. The PDCCH communication may schedule a physical downlink shared channel (PDSCH) communication that includes the RAR. For example, the PDCCH communication may indicate a resource allocation (such as in downlink control information (DCI)) for the PDSCH communication.

As shown by reference number 445, as part of the second step of the two-step random access procedure, the wireless node 410 may transmit the PDSCH communication for the RAR, as scheduled by the PDCCH communication. The RAR may be included in a medium access control (MAC) protocol data unit (PDU) of the PDSCH communication. In some aspects, described elsewhere herein, the PDSCH communication may include a PTRS. As shown by reference number 450, if the wireless node 405 successfully receives the RAR, the wireless node 405 may transmit a hybrid automatic repeat request (HARD) acknowledgement (ACK).

Figure 5:
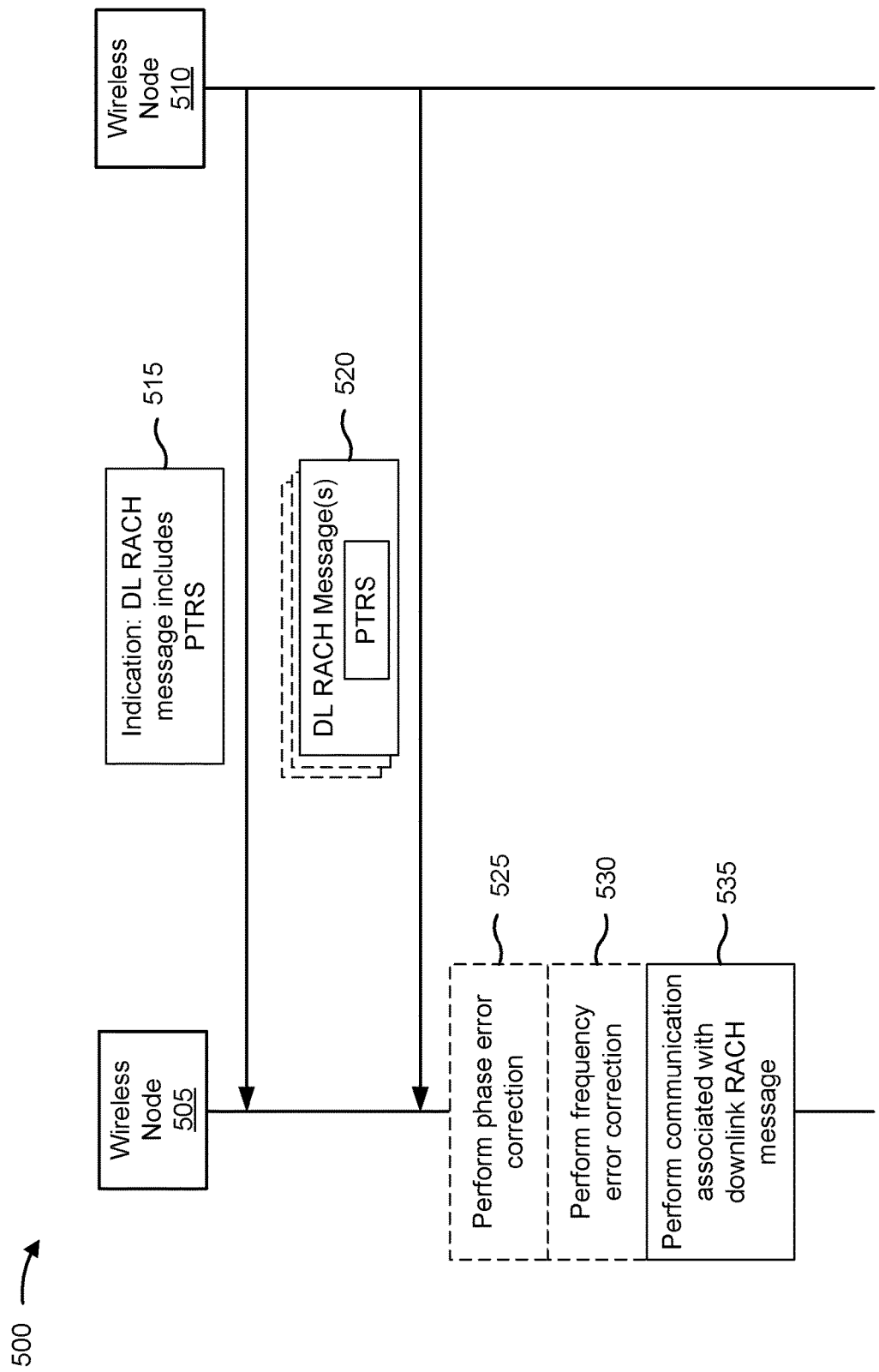
FIG. 5 is a diagram illustrating an example associated with phase tracking reference signal (PTRS) for random access.

FIG. 5 is a diagram illustrating an example 500 associated with a PTRS for random access. As shown in FIG. 5, a wireless node 505 (which may include UE 120, BS 110, a relay node, a TRP, a sidelink device, a distributed unit, a radio unit, or another device) and a wireless node 510 (which may include UE 120, BS 110, a relay node, a TRP, a sidelink device, a distributed unit, a radio unit, a central unit, or another device) may communicate with one another to perform a random access procedure. For example, the wireless node 505 and the wireless node 510 may perform a four-step random access procedure, as described above with respect to FIG. 3, or a two-step random access procedure, as described above with respect to FIG. 4. In some examples, the wireless node 505 may be a UE such as the UE 120 and the wireless node 510 may be a base station such as the BS 110.

As shown by reference number 515, the wireless node 505 receives an indication from the wireless node 510. The indication may indicate that a downlink RACH message includes a PTRS. In some aspects, the indication may include data that enables the wireless node 505 to determine that a downlink RACH message includes a PTRS.

In some aspects, the indication is an implicit indication. For example, the indication may be implicit in an indication of repetition or a pattern of repetition. An indication of repetition includes information indicating that a communication (such as a downlink RACH message) is associated with multiple repetitions. A pattern of repetition indicates a configuration for the multiple repetitions, such as a periodicity associated with the multiple repetitions, one or more resource allocations for the multiple repetitions, transmission parameters for the multiple repetitions, or other information. As an example of implicit indication, the wireless node 505 may determine that a downlink RACH message is to include a PTRS if two consecutive repetitions of the downlink RACH message are separated from each other in time. The two consecutive repetitions of the downlink RACH messages may be separated in time based on an uplink transmission slot being positioned, in time, between the two downlink RACH messages. Thus, in one example, the presence of the uplink transmission between resources for the two downlink RACH messages may implicitly indicate, to the wireless node 505, that the two downlink RACH messages include a PTRS.

In some aspects, the wireless node 505 and the wireless node 510 perform a four-step random access procedure. In such aspects, the wireless node 505 may receive the indication in a second RACH message of the four-step RACH procedure (such as RACH message 2). The wireless node 505 may determine, based on the indication, that the PTRS is included in a fourth RACH message of the four-step RACH procedure. For example, the wireless node 505 may ascertain, obtain or determine, in accordance with the indication, that the PTRS is included in the fourth RACH message. Providing the indication via the second RACH message may reduce system information overhead and may provide increased flexibility for selective usage of the PTRS.

In some aspects, the wireless node 505 receives the indication via a system information block (SIB). For example, the wireless node 510 may transmit an SIB (such as SIB 1) to enable the presence of a PTRS in one or multiple downlink RACH messages. Providing the indication via the SIB may reduce overhead associated with initial access messaging, such as RACH message 2 or a control channel associated with a downlink RACH message.

In some aspects, the indication is received via a control channel associated with the downlink RACH message. For example, for a four-step random access procedure, the wireless node 505 may receive, via a RACH message 2 PDCCH, an indication that a PTRS is included in a RACH message 2 of the four-step random access procedure. As another example, for a four-step random access procedure, the wireless node 505 may receive, via a RACH message 2 PDCCH, an indication that a PTRS is included in a RACH message 4 of the four-step random access procedure. As yet another example, the wireless node 505 may receive, via a RACH message 4 PDCCH, an indication that enables the wireless node 505 to determine that a PTRS is included in a RACH message 4 of the four-step random access procedure. For a two-step RACH procedure, the wireless node 505 may receive, via a RACH message B PDCCH, an indication that a PTRS is included in a RACH message B of the two-step random access procedure.

As shown by reference number 520, the wireless node 505 may receive one or more downlink RACH messages that include the PTRS. In some aspects, the wireless node 505 may receive a single repetition of the downlink RACH message. In some other aspects, the wireless node 505 may receive multiple repetitions of the downlink RACH message. The downlink RACH message that includes the PTRS may include a second RACH message of a four-step RACH procedure, a fourth RACH message of a four-step RACH procedure, or a second RACH message of a two-step RACH procedure. The wireless node 505 may determine that the downlink RACH message includes the PTRS based on the indication.

In some aspects, the downlink RACH message includes the PTRS if a condition is satisfied. The condition may be associated with a frequency band of the downlink RACH message, a frequency range of the downlink RACH message, or a subcarrier spacing associated with the downlink RACH message. For example, the condition may be associated with the frequency band of the downlink RACH message (that is, a set of frequency bands may be configured to have downlink RACH messages that include a PTRS) such that a downlink RACH message, received by the wireless node 505 via one of the set of frequency bands, may include the PTRS. The condition can be implemented in association with the indications described above at reference number 515, or without the wireless node 505 receiving an indication. For example, the wireless node 505 may determine whether the condition is satisfied, and thus whether a downlink RACH message is expected to include a PTRS, without having received an indication regarding the PTRS.

In some aspects, the condition may be associated with the frequency range of the downlink RACH message (that is, downlink RACH messages in a given frequency range such as FR1 or FR2 may be configured to include a PTRS) and the condition may be satisfied when the downlink RACH message is transmitted within the frequency range. In some aspects, the condition may be associated with a subcarrier spacing associated with the downlink RACH message (that is, downlink RACH messages with a given subcarrier spacing may be configured to include a PTRS), and the condition may be satisfied when the downlink RACH message is transmitted using the given subcarrier spacing.

The PTRS may be included in the downlink RACH message based on one or more parameters associated with the PTRS. For example, the PTRS may be embedded in a physical downlink shared channel (PDSCH) resource allocation in association with up to two ports. In some aspects, the presence and density of the PTRS may be based on one or more of a modulation and coding scheme (MCS) or a resource block (RB) allocation size of the PDSCH resource allocation. For example, the wireless node 505 may be configured with an MCS threshold and an RB allocation size threshold, and may determine the presence and density of the PTRS using the MCS threshold and the RB allocation size threshold. In some other aspects, the presence and density of the PTRS is indicated by the indication of the presence of the PTRS for the downlink RACH message. For example, the PTRS may use a default density and resource allocation if the PTRS is activated for the downlink RACH message. In some aspects, the PTRS may be a repetition of a demodulation reference signal (DMRS). For example, the PTRS may be a repetition of a DMRS signal within the PDSCH (such as for a cyclic prefix orthogonal frequency division multiplexing waveform). In some aspects, if a symbol (such as an orthogonal frequency division multiplexing (OFDM) symbol) contains a DMRS, the DMRS may be used as a PTRS. For example, the wireless node 505 may perform phase error estimation using the DMRS.

In some aspects, a parameter of the one or more parameters associated with the PTRS (such as the number of ports, the MCS threshold, the RB allocation size threshold, the presence of the PTRS, or the density of the PTRS) may be predefined. For example, the one or more parameters associated with the PTRS (such as one or more parameters for msg2, msg4, or msgB) may be predefined by system information (such as system information transmitted by the base station via SIB 1) or predefined in a specification of a wireless communication standard. As shown by reference number 525, in some aspects, the wireless node 505 may perform phase error correction based on the PTRS. For example, the wireless node 505 may perform phase error correction if the downlink RACH message includes multiple repetitions. The wireless node 505 may receive multiple repetitions of the downlink RACH message that includes the PTRS. The wireless node 505 may perform phase error correction for the multiple repetitions of the downlink RACH message using the PTRS. For example, the wireless node 505 may identify a phase error (such as a difference in phase relative to a baseline phase known to the wireless node 505 and the wireless node 510 or a phase of a previous repetition) by reference to the PTRS. The wireless node 505 may process the multiple repetitions of the downlink RACH message based on the phase error. For example, the wireless node 505 may apply phase offsets to one or more repetitions such that the multiple repetitions can be successfully combined by demodulation reference signal bundling, and may combine the multiple repetitions via demodulation reference signal bundling. In some aspects, the wireless node 505 may perform phase error correction based on there being multiple repetitions of the downlink RACH message. For example, the wireless node 505 may not perform phase error correction for a one-shot downlink RACH message transmission.

As shown by reference number 530, in some aspects, the wireless node 505 may perform frequency error correction. The wireless node 505 may perform frequency error correction in addition to, or as an alternative to, phase error correction. For example, the wireless node 505 may perform frequency error correction for the downlink RACH message that includes the PTRS using the PTRS. In some aspects, the wireless node 505 may identify a frequency error (such as a difference in frequency relative to a baseline frequency known to the wireless node 505 and the wireless node 510 or a frequency of a previous repetition) by reference to the PTRS. The wireless node 505 may process the downlink RACH message based on the frequency error. For example, the wireless node 505 may apply a frequency offset to the downlink RACH message such that the downlink RACH message can be successfully decoded.

As shown by reference number 535, the wireless node 505 may perform communication associated with the downlink RACH message. For example, the wireless node 505 may perform initial access. As another example, the wireless node 505 may establish an RRC connection with the wireless node 510. As yet another example, the wireless node 505 may select or identify a beam pair for connection with wireless node 510 based on the downlink RACH message.

Figure 6:
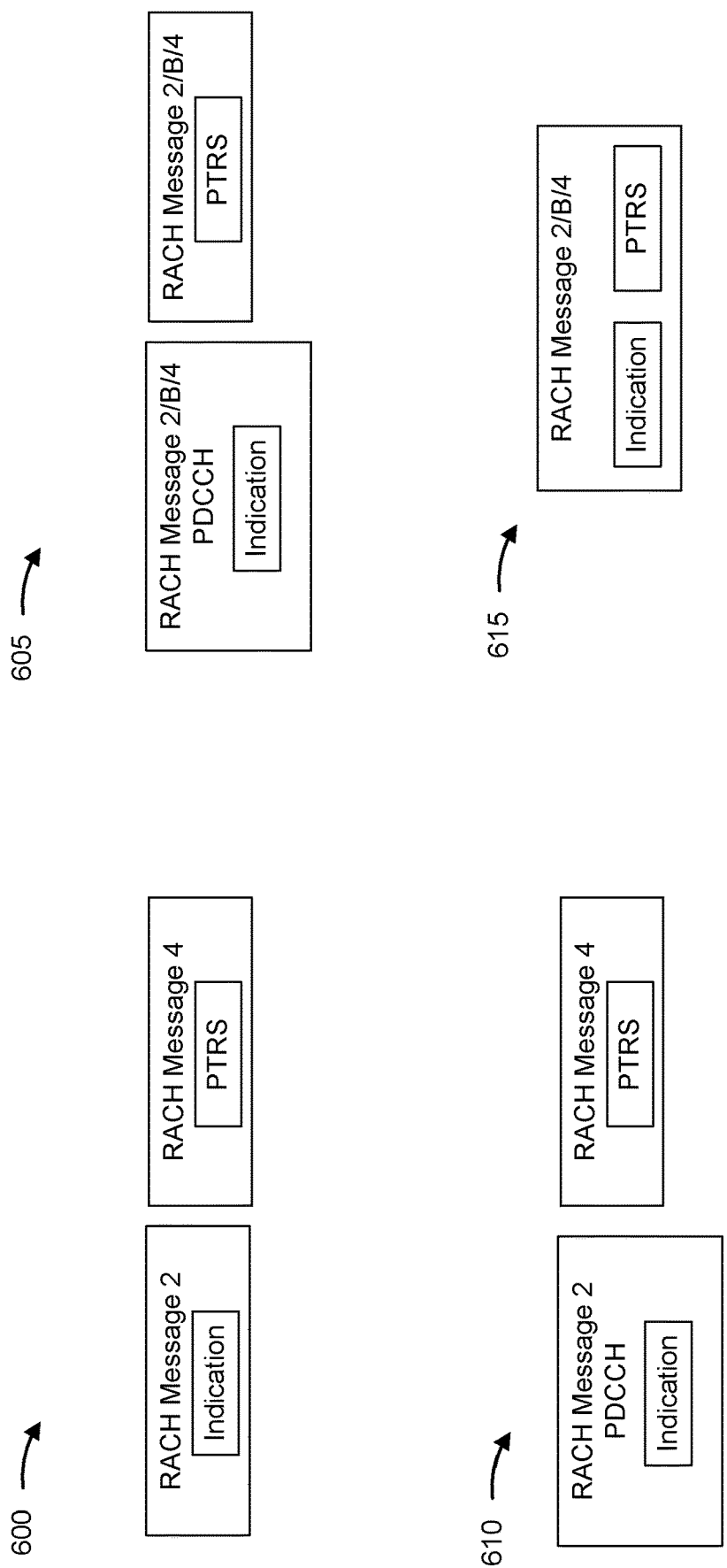
FIG. 6 is a diagram illustrating examples of indications that a downlink random access channel (RACH) message includes a PTRS.

FIG. 6 is a diagram illustrating examples of indications that a downlink RACH includes a PTRS. With respect to FIG. 6, in some aspects, a first wireless node (such as BS 110, a central unit, a distributed unit, or a radio unit) may transmit a SIB to enable a PTRS to be included in one or multiple downlink RACH messages. For example, the first wireless node may transmit an SIB having a 1-bit flag set to enable a PTRS to be included in one or multiple downlink RACH messages. Subsequently, the first wireless node may transmit, to a second wireless node (such as UE 120), an indication that a downlink RACH message will include a PTRS. Four examples 600, 605, 610, and 615 of indications and corresponding downlink RACH messages are shown in FIG. 6. In some aspects, the SIB may indicate that the downlink RACH message will include a PTRS (not shown in FIG. 6). As shown in FIG. 6, a downlink RACH message transmitted as part of a random access procedure may include an indication that the downlink RACH message that includes the indication, or a subsequent downlink RACH message transmitted as part of the random access procedure, includes a PTRS.

In some aspects, the first wireless node and the second wireless node may perform a four-step random access procedure, as described above with respect to FIG. 3. As shown by example 600, a second downlink RACH message (RACH Message 2, as shown in FIG. 6) of the four-step random access procedure includes an indication that enables the second wireless node to determine that a fourth downlink RACH message (RACH Message 4, as shown in FIG. 6) of the four-step random access procedure includes a PTRS.

In some aspects, the second wireless node receives the indication via a control channel associated with the downlink RACH message that includes the PTRS. For example, in example 605, the second wireless node may receive an indication via a RACH message 2 PDCCH. The second wireless node may determine, based on the indication, that a RACH message 2 transmitted as part of a four-step random access procedure includes a PTRS. As another example, the second wireless node may receive an indication via a RACH message 4 PDCCH. The second wireless node may determine, based on the indication, that a RACH message 4 transmitted as part of a four-step random access procedure includes a PTRS. As yet another example, the second wireless node may receive an indication via a RACH message B PDCCH. The second wireless node may determine, based on the indication, that a RACH message B transmitted as part of a two-step random access procedure includes a PTRS.

In some aspects, the second wireless node receives the indication via a control channel associated with a downlink RACH message that is different from the downlink RACH message that includes the PTRS. For example, as shown by example 610, the second wireless node may receive an indication via a RACH message 2 PDCCH. The second wireless node may determine, based on the indication, that a RACH message 4 transmitted as part of a four-step random access procedure includes a PTRS.

In some aspects, the second wireless node receives the indication via a downlink RACH message that includes the PTRS. For example, as shown by example 615, the indication and the PTRS may be included in a RACH message 2 or a RACH message 4 transmitted as part of a four-step random access procedure or a RACH message B transmitted as part of a two-step random access procedure. In such an example, both the indication and the PTRS may be included in a PDSCH of the downlink RACH message.

Figure 7:
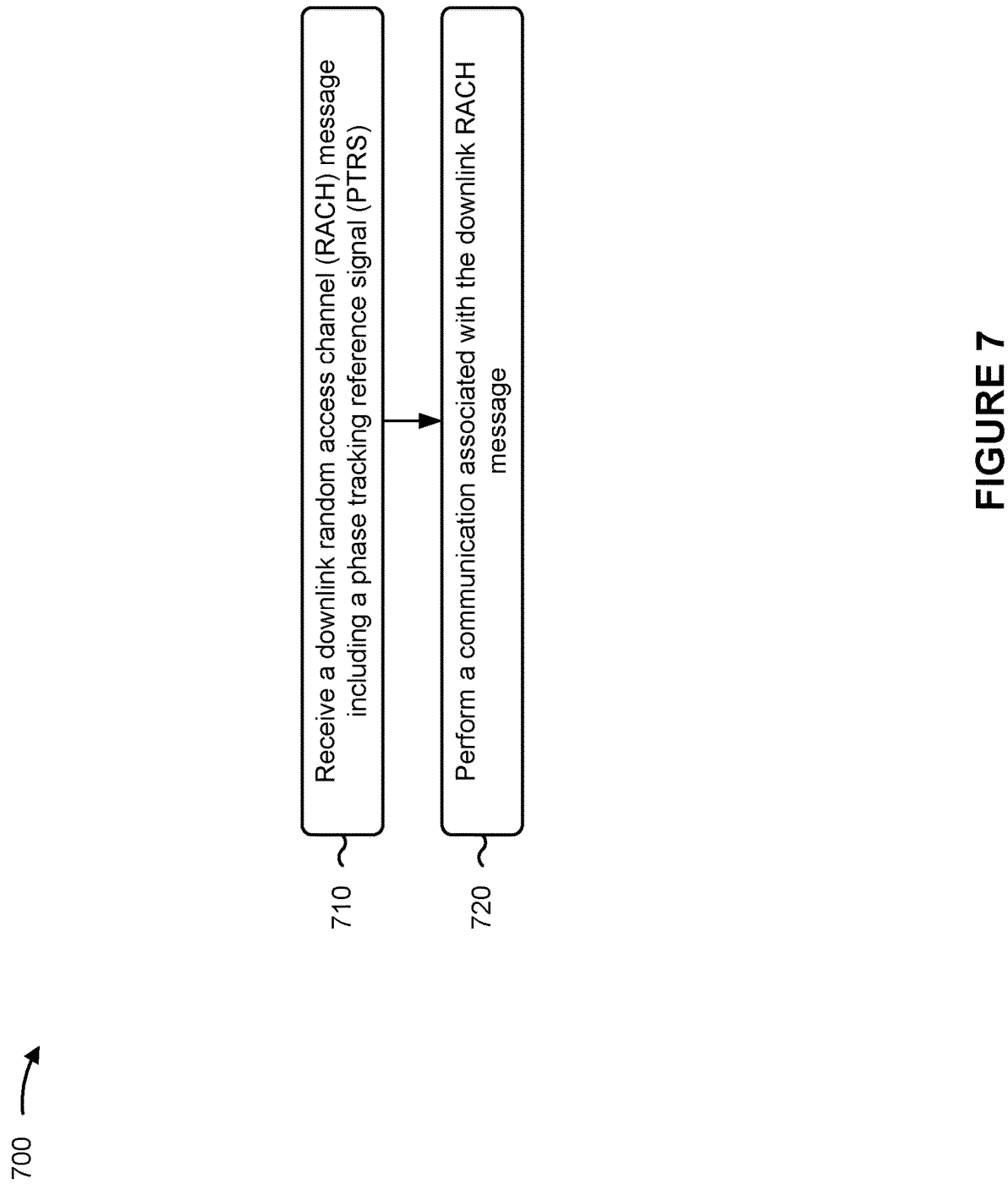
FIG. 7 is a diagram illustrating an example process performed, for example, by a wireless node.

FIG. 7 is a diagram illustrating an example process 700 performed, for example, by a wireless node. The process 700 is an example where the wireless node (for example, UE 120, or a component of the wireless node, such as one or more components described with regard to FIG. 1 or FIG. 9) performs operations associated with a PTRS for random access.

As shown in FIG. 7, in some aspects, the process 700 may include receiving a downlink RACH message including a PTRS (block 710). For example, the wireless node (such as by using communication manager 140 or reception component 902, depicted in FIG. 9) may receive a downlink RACH message including a PTRS, as described above.

As further shown in FIG. 7, in some aspects, the process 700 may include performing a communication associated with the downlink RACH message (block 720). For example, the wireless node (such as by using communication manager 140 or communication component 908, depicted in FIG. 9) may perform a communication associated with the downlink RACH message, as described above.

The process 700 may include additional aspects, such as any single aspect or any combination of aspects described below or in connection with one or more other processes described elsewhere herein.

In a first additional aspect, the process 700 includes receiving an indication that the downlink RACH message includes the PTRS.

In a second additional aspect, alone or in combination with the first aspect, the indication is received via an SIB.

In a third additional aspect, alone or in combination with one or more of the first and second aspects, the indication is received via a control channel associated with the downlink RACH message.

In a fourth additional aspect, alone or in combination with one or more of the first through third aspects, the downlink RACH message is a fourth RACH message of a four-step RACH procedure, and the indication is received in a second RACH message of the four-step RACH procedure.

In a fifth additional aspect, alone or in combination with one or more of the first through fourth aspects, the indication is implicit in an indication of repetition or a parameter of repetition.

In a sixth additional aspect, alone or in combination with one or more of the first through fifth aspects, the indication is associated with two consecutive repetitions of the downlink RACH message being separated from each other in time.

In a seventh additional aspect, alone or in combination with one or more of the first through sixth aspects, the process 700 includes receiving one or more parameters associated with the PTRS via system information.

In an eighth additional aspect, alone or in combination with one or more of the first through seventh aspects, the communication is based on one or more parameters for the PTRS, and the one or more parameters are predefined.

In a ninth additional aspect, alone or in combination with one or more of the first through eighth aspects, the process 700 includes receiving multiple repetitions of the downlink RACH message including the PTRS, and performing phase error correction for the multiple repetitions using the PTRS.

In a tenth additional aspect, alone or in combination with one or more of the first through ninth aspects, the process 700 includes performing frequency error correction for the downlink RACH message using the PTRS.

In an eleventh additional aspect, alone or in combination with one or more of the first through tenth aspects, the downlink RACH message includes the PTRS if a condition is satisfied, where the condition is associated with at least one of a frequency band of the downlink RACH message, a frequency range of the downlink RACH message, or a subcarrier spacing associated with the downlink RACH message.

In a twelfth additional aspect, alone or in combination with one or more of the first through eleventh aspects, the downlink RACH message includes at least one of a second RACH message of a four-step RACH procedure, a fourth RACH message of the four-step RACH procedure, or a second RACH message of a two-step RACH procedure.

Although FIG. 7 shows example blocks of the process 700, in some aspects, the process 700 may include additional blocks, fewer blocks, different blocks, or differently arranged blocks than those depicted in FIG. 7. Additionally, or alternatively, two or more of the blocks of the process 700 may be performed in parallel.

Figure 8:
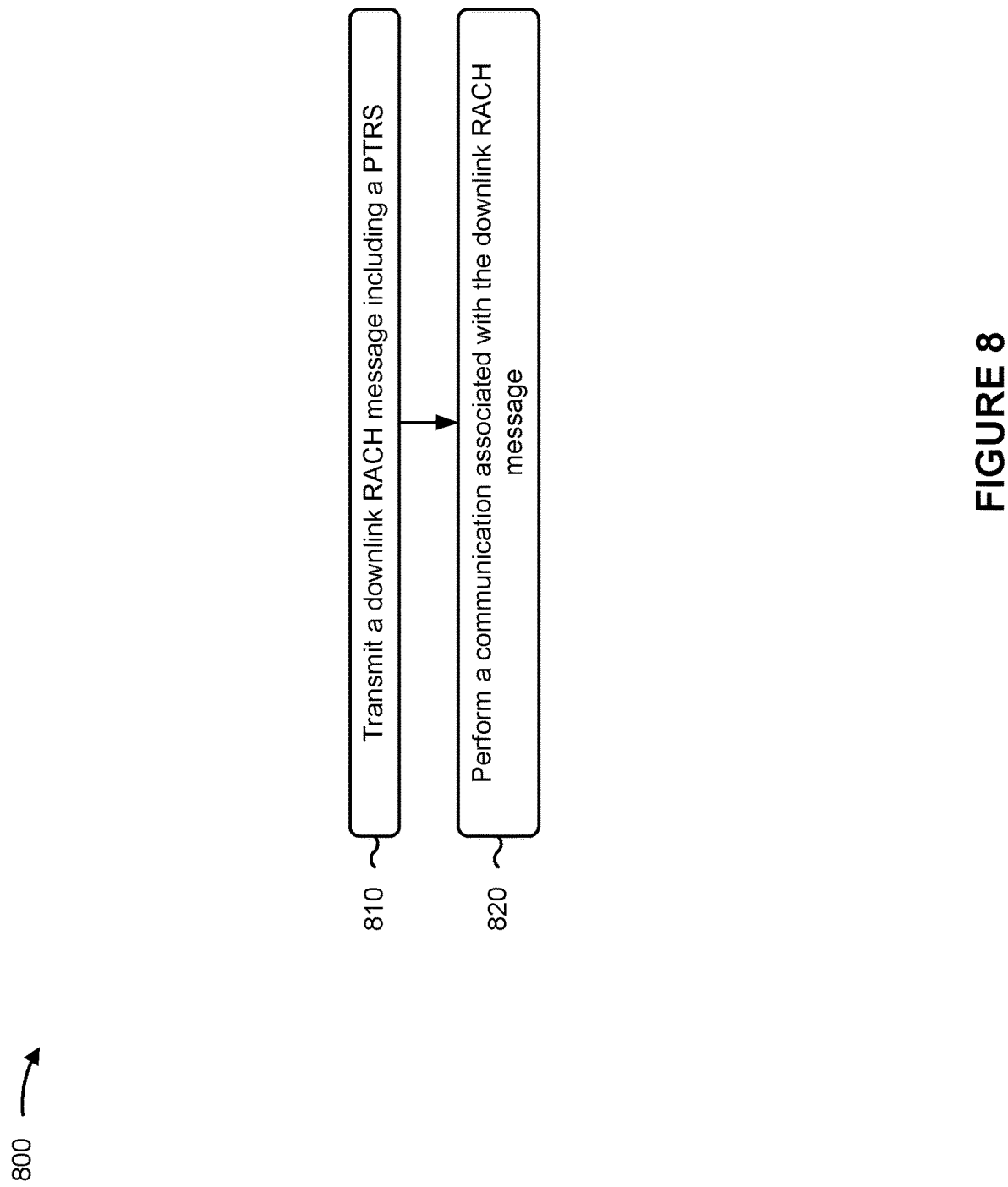
FIG. 8 is a diagram illustrating an example process performed, for example, by a component of a BS.

FIG. 8 is a diagram illustrating an example process 800 performed, for example, by a component of a wireless node such as a BS. The process 800 is an example where the component of the wireless node (for example, a component of the BS 110 described with regard to FIG. 2 or FIG. 10, a central unit, a distributed unit, a radio unit, or a combination thereof) performs operations associated with a PTRS for random access.

As shown in FIG. 8, in some aspects, the process 800 may include transmitting a downlink RACH message including a PTRS (block 810). For example, the component (such as by using communication manager 150 or transmission component 1004, depicted in FIG. 10) may transmit a downlink RACH message including a PTRS, as described above.

As further shown in FIG. 8, in some aspects, the process 800 may include performing a communication associated with the downlink RACH message (block 820). For example, the component (such as by using communication manager 150 or communication component 1008, depicted in FIG. 10) may perform a communication associated with the downlink RACH message, as described above.

The process 800 may include additional aspects, such as any single aspect or any combination of aspects described below or in connection with one or more other processes described elsewhere herein.

In a first additional aspect, the process 800 includes transmitting an indication that the downlink RACH message includes the PTRS.

In a second additional aspect, alone or in combination with the first aspect, the indication is transmitted via a system information block.

In a third additional aspect, alone or in combination with one or more of the first and second aspects, the indication is transmitted via a control channel associated with the downlink RACH message.

In a fourth additional aspect, alone or in combination with one or more of the first through third aspects, the downlink RACH message is a fourth RACH message of a four-step RACH procedure, and the indication is transmitted in a second RACH message of the four-step RACH procedure.

In a fifth additional aspect, alone or in combination with one or more of the first through fourth aspects, the indication is implicit in an indication of repetition or a parameter of repetition.

In a sixth additional aspect, alone or in combination with one or more of the first through fifth aspects, the indication is associated with two consecutive repetitions of the downlink RACH message being separated from each other in time.

In a seventh additional aspect, alone or in combination with one or more of the first through sixth aspects, the process 800 includes transmitting one or more parameters associated with the PTRS via system information.

In an eighth additional aspect, alone or in combination with one or more of the first through seventh aspects, the communication is based on one or more parameters for the PTRS, and the one or more parameters are predefined.

In a ninth additional aspect, alone or in combination with one or more of the first through eighth aspects, the process 800 includes transmitting multiple repetitions of the downlink RACH message including the PTRS.

In a tenth additional aspect, alone or in combination with one or more of the first through ninth aspects, the downlink RACH message includes the PTRS if a condition is satisfied, where the condition is associated with at least one of a frequency band of the downlink RACH message, a frequency range of the downlink RACH message, or a subcarrier spacing associated with the downlink RACH message.

In an eleventh additional aspect, alone or in combination with one or more of the first through tenth aspects, the downlink RACH message includes at least one of a second RACH message of a four-step RACH procedure, a fourth RACH message of the four-step RACH procedure, or a second RACH message of a two-step RACH procedure.

Although FIG. 8 shows example blocks of the process 800, in some aspects, the process 800 may include additional blocks, fewer blocks, different blocks, or differently arranged blocks than those depicted in FIG. 8. Additionally, or alternatively, two or more of the blocks of the process 800 may be performed in parallel.

Figure 9:
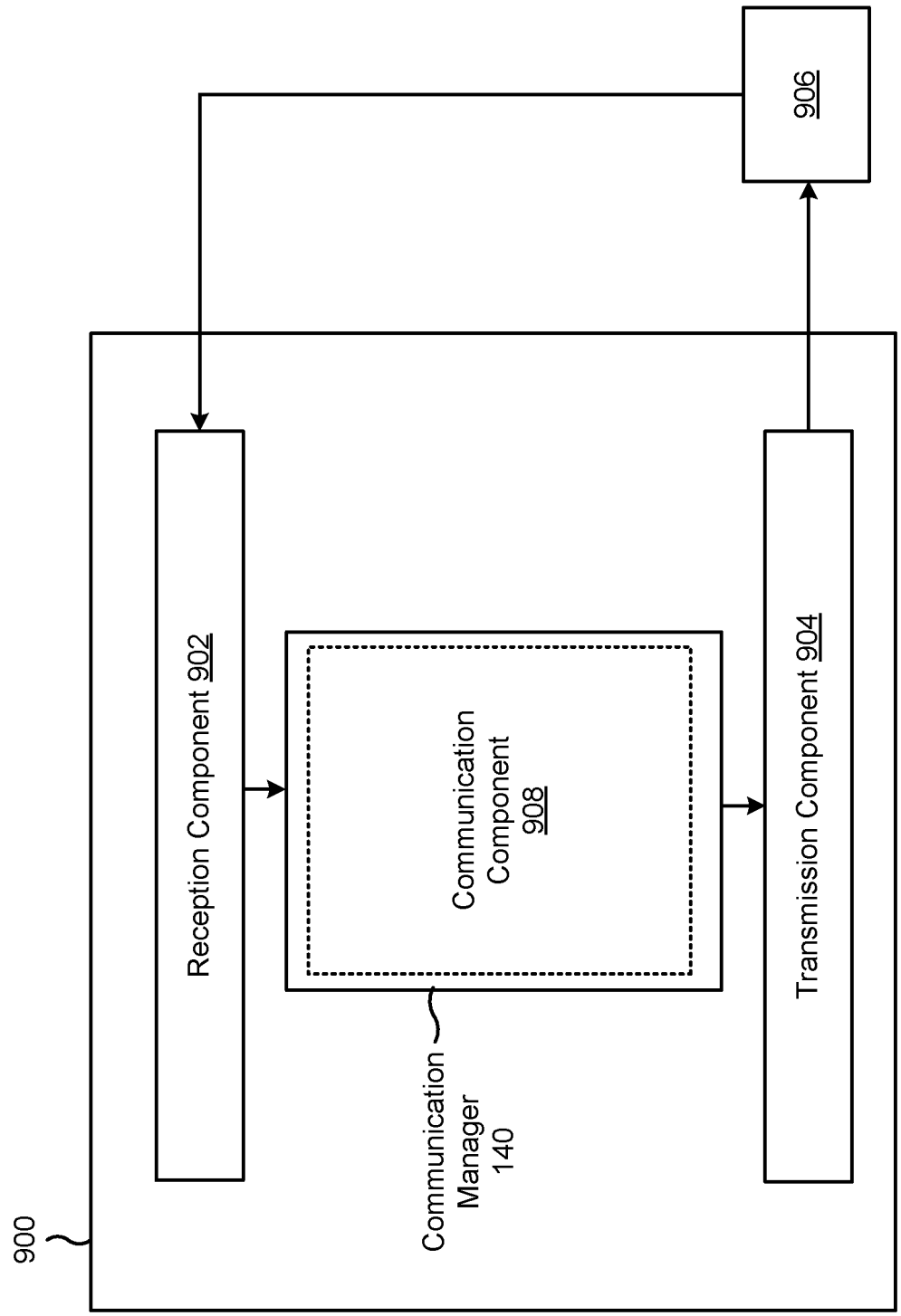
FIGS. 9 and 10 are block diagrams of example apparatuses for wireless communication.

FIG. 9 is a block diagram of an example apparatus 900 for wireless communication. The apparatus 900 may be a wireless node (such as the UE 120 or the BS 110), or a wireless node may include the apparatus 900. In some aspects, the apparatus 900 includes a reception component 902 and a transmission component 904, which may be in communication with one another (for example, via one or more buses or one or more other components). As shown, the apparatus 900 may communicate with another apparatus 906 (such as a UE, a BS, or another wireless node) using the reception component 902 and the transmission component 904. As further shown, the apparatus 900 may include the communication manager 140. The communication manager 140 may include a communication component 908, among other examples.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 700. In some aspects, the apparatus 900 or one or more components shown in FIG. 9 may include one or more components of the wireless node described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the wireless node described above in connection with FIG. 2. In some aspects, the reception component 902 may be coupled to or may communicate with a radio communication component, which may include one or more antennas, a modulator, a transmit MIMO processor, a transmit processor, a controller/processor, a memory, or a combination thereof. For example, the reception component 902 may receive information derived from signals received by the radio communication component.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the wireless node described above in connection with FIG. 2. In some aspects, the transmission component 904 may be co-located with the reception component 902 in a transceiver. In some aspects, the transmission component 904 may be coupled to or may communicate with a radio communication component, which may include one or more antennas, a modulator, a transmit MIMO processor, a transmit processor, a controller/processor, a memory, or a combination thereof. For example, the transmission component 904 may provide information regarding signals to be transmitted by the radio communication component.

The reception component 902 may receive a downlink RACH message including a PTRS. The communication component 908 may perform a communication associated with the downlink RACH message.

The reception component 902 may receive an indication that the downlink RACH message includes the PTRS.

The reception component 902 may receive one or more parameters associated with the PTRS via system information.

The reception component 902 may receive multiple repetitions of the downlink RACH message including the PTRS.

The communication component 908 may perform phase error correction for the multiple repetitions using the PTRS.

The communication component 908 may perform frequency error correction for the downlink RACH message using the PTRS.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
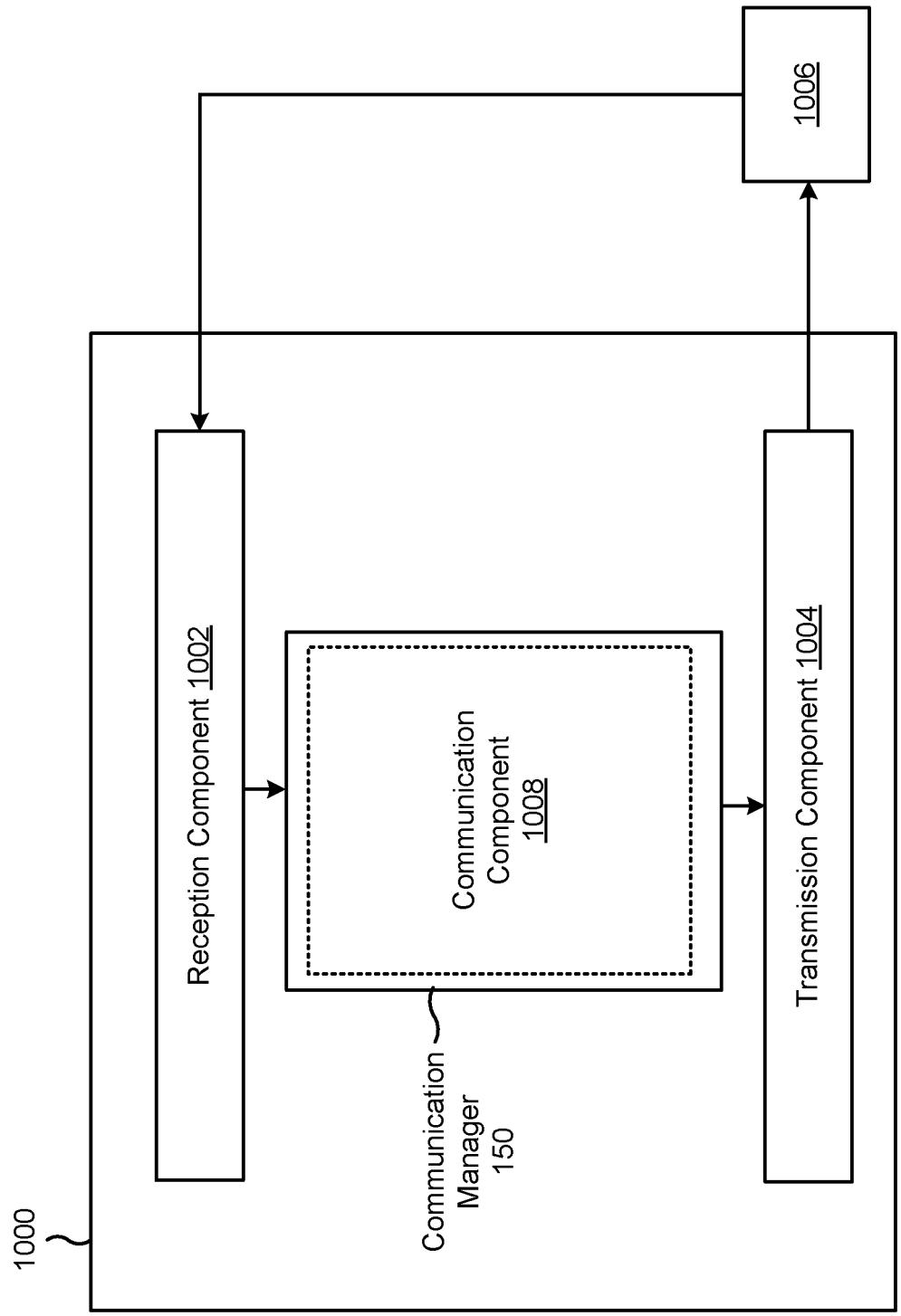

FIG. 10 is a block diagram of an example apparatus 1000 for wireless communication. The apparatus 1000 may be a component of a wireless node such as a BS (such as a component of the BS 110, a central unit, a distributed unit, a radio unit, or a combination thereof), or a component of a wireless node may include the apparatus 1000. In some aspects, the apparatus 1000 includes a reception component 1002 and a transmission component 1004, which may be in communication with one another (for example, via one or more buses or one or more other components). As shown, the apparatus 1000 may communicate with another apparatus 1006 (such as a UE, a BS, or another wireless node) using the reception component 1002 and the transmission component 1004. As further shown, the apparatus 1000 may include the communication manager 150. The communication manager 150 may include a communication component 1008, among other examples.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8. In some aspects, the apparatus 1000 or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the BS described above in connection with FIG. 2. In some aspects, the reception component 1002 may be coupled to or may communicate with a radio communication component, which may include one or more antennas, a modulator, a transmit MIMO processor, a transmit processor, a controller/processor, a memory, or a combination thereof. For example, the reception component 1002 may receive information derived from signals received by the radio communication component.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver. In some aspects, the transmission component 1004 may be coupled to or may communicate with a radio communication component, which may include one or more antennas, a modulator, a transmit MIMO processor, a transmit processor, a controller/processor, a memory, or a combination thereof. For example, the transmission component 1004 may provide information regarding signals to be transmitted by the radio communication component.

The transmission component 1004 may transmit a downlink RACH message including a phase PTRS. The communication component 1008 may perform a communication associated with the downlink RACH message.

The transmission component 1004 may transmit an indication that the downlink RACH message includes the PTRS.

The transmission component 1004 may transmit one or more parameters associated with the PTRS via system information.

The transmission component 1004 may transmit multiple repetitions of the downlink RACH message including the PTRS.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components.

Additionally, or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, satisfying a threshold may refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a-b, a-c, b-c, and a-b-c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. An apparatus of a wireless node for wireless communication, comprising:
    an interface configured to obtain a downlink random access channel (RACH) message including a phase tracking reference signal (PTRS); and
    a processing system configured to perform a communication associated with the downlink RACH message.

2. The apparatus of claim 1, wherein the interface is further configured to:
    obtain an indication that the downlink RACH message includes the PTRS.

3. The apparatus of claim 2, wherein the indication is obtained via a system information block (SIB).

4. The apparatus of claim 2, wherein the indication is obtained via a control channel associated with the downlink RACH message.

5. The apparatus of claim 2, wherein the downlink RACH message is a fourth RACH message of a four-step RACH procedure, and wherein the indication is obtained from a second RACH message of the four-step RACH procedure.

6. The apparatus of claim 2, wherein the indication is implicit in an indication of repetition or a parameter of repetition.

7. The apparatus of claim 6, wherein the indication is associated with two consecutive repetitions of the downlink RACH message being separated from each other in time.

8. The apparatus of claim 1, wherein the interface is further configured to:
    obtain one or more parameters associated with the PTRS via system information.

9. The apparatus of claim 1, wherein the communication is associated with one or more parameters for the PTRS, and wherein the one or more parameters are predefined.

10. The apparatus of claim 1, wherein the interface is further configured to:
    obtain multiple repetitions of the downlink RACH message including the PTRS; and
    wherein the processing system is further configured to perform phase error correction for the multiple repetitions using the PTRS.

11. The apparatus of claim 1, wherein the processing system is further configured to:
    perform frequency error correction for the downlink RACH message using the PTRS.

12. The apparatus of claim 1, wherein the downlink RACH message includes the PTRS if a condition is satisfied, wherein the condition is associated with at least one of:
    a frequency band of the downlink RACH message,
    a frequency range of the downlink RACH message, or
    a subcarrier spacing associated with the downlink RACH message.

13. The apparatus of claim 1, wherein the downlink RACH message includes at least one of:
    a second RACH message of a four-step RACH procedure,
    a fourth RACH message of the four-step RACH procedure, or
    a second RACH message of a two-step RACH procedure.

14. An apparatus of a wireless node for wireless communication, comprising:
    an interface configured to:
        output a downlink random access channel (RACH) message including a phase tracking reference signal (PTRS); and
        perform a communication associated with the downlink RACH message.

15. The apparatus of claim 14, wherein the interface is further configured to:
    output an indication that the downlink RACH message includes the PTRS.

16. The apparatus of claim 15, wherein the indication is output via a system information block or a control channel associated with the downlink RACH message.

17. The apparatus of claim 15, wherein the downlink RACH message is a fourth RACH message of a four-step RACH procedure, and wherein the indication is output in a second RACH message of the four-step RACH procedure.

18. The apparatus of claim 15, wherein the indication is implicit in an indication of repetition or a parameter of repetition.

19. The apparatus of claim 18, wherein the indication is associated with two consecutive repetitions of the downlink RACH message being separated from each other in time.

20. The apparatus of claim 14, wherein the interface is further configured to:
    output one or more parameters associated with the PTRS via system information.

21. The apparatus of claim 14, wherein the interface is further configured to:
    output multiple repetitions of the downlink RACH message including the PTRS.

22. A method of wireless communication performed by a wireless node, comprising:
- receiving a downlink random access channel (RACH) message including a phase tracking reference signal (PTRS); and
- performing a communication associated with the downlink RACH message.

23. The method of claim 22, further comprising:
- receiving an indication that the downlink RACH message includes the PTRS.

24. The method of claim 23, wherein the indication is implicit in an indication of repetition or a parameter of repetition.

25. The method of claim 22, further comprising:
- receiving one or more parameters associated with the PTRS via system information.

26. The method of claim 22, further comprising:
- receiving multiple repetitions of the downlink RACH message including the PTRS; and
- performing phase error correction for the multiple repetitions using the PTRS.

27. The method of claim 22, further comprising:
- performing frequency error correction for the downlink RACH message using the PTRS.

28. A method of wireless communication performed by a component of a base station, comprising:
- transmitting a downlink random access channel (RACH) message including a phase tracking reference signal (PTRS); and
- performing a communication associated with the downlink RACH message.

29. The method of claim 28, further comprising:
- transmitting an indication that the downlink RACH message includes the PTRS.

30. The method of claim 28, further comprising:
- transmitting one or more parameters associated with the PTRS via system information.

* * * * *